US010745325B2

(12) United States Patent
Shim et al.

(10) Patent No.: US 10,745,325 B2
(45) Date of Patent: Aug. 18, 2020

(54) PROTECTIVE LAYER FOR A CERAMIC MATRIX COMPOSITE ARTICLE

(71) Applicant: Rolls-Royce High Temperature Composites, Inc., Cypress, CA (US)

(72) Inventors: Sungbo Shim, Irvine, CA (US); Michael Abbott, Anaheim, CA (US)

(73) Assignee: Rolls-Royce High Temperature Composites, Inc., Cypress, CA (US)

(*) Notice: Subject to any disclaimer, the term of this patent is extended or adjusted under 35 U.S.C. 154(b) by 212 days.

(21) Appl. No.: 15/845,612

(22) Filed: Dec. 18, 2017

(65) Prior Publication Data
US 2019/0185384 A1 Jun. 20, 2019

(51) Int. Cl.
*C04B 35/80* (2006.01)
*C04B 35/657* (2006.01)
(Continued)

(52) U.S. Cl.
CPC .......... *C04B 35/806* (2013.01); *C04B 35/573* (2013.01); *C04B 35/6263* (2013.01); *C04B 35/6286* (2013.01); *C04B 35/62849* (2013.01); *C04B 35/62852* (2013.01); *C04B 35/62863* (2013.01); *C04B 35/62868* (2013.01); *C04B 35/62871* (2013.01); *C04B 35/62892* (2013.01); *C04B 35/62894* (2013.01); *C04B 35/657* (2013.01); *C04B 2235/424* (2013.01);
(Continued)

(58) Field of Classification Search
CPC ................ C04B 35/657; C04B 35/806; C04B 2235/428; C04B 2235/612; C04B 2235/616; C04B 2235/5244
See application file for complete search history.

(56) References Cited

U.S. PATENT DOCUMENTS 4,242,106 A    12/1980   Morelock
5,015,540 A *   5/1991   Borom ................. C04B 35/573
                                              264/332
(Continued)

FOREIGN PATENT DOCUMENTS

DE    102007063517 B3    1/2009
EP         1636148 A2    3/2006
(Continued)

OTHER PUBLICATIONS

Abramshe et al., "Effective Cleaning Methods and Best Practices of Synthetic Industrial Diamond," Mar. 1, 2007, rdmag.com, 8 pp.
(Continued)

*Primary Examiner* — Nathan H Empie
(74) *Attorney, Agent, or Firm* — Shumaker & Sieffert, P.A.

(57) ABSTRACT

A method including infiltrating a porous fiber preform with a slurry including a carrier fluid and a first plurality of solid particles wherein the first plurality of solid particles includes at least a first ceramic material, drying the slurry to form a greenbody preform, machining the greenbody preform to a target dimension, depositing a protective layer precursor including a second plurality of solid particles on the machined greenbody preform wherein the second plurality of solid particles includes at least a second ceramic material, and infiltrating the machined greenbody preform with a molten infiltrant to form a composite article including an integral protective layer.

20 Claims, 7 Drawing Sheets

(51) Int. Cl.
*C04B 35/628* (2006.01)
*C04B 35/626* (2006.01)
*C04B 35/573* (2006.01)

(52) U.S. Cl.
CPC .. *C04B 2235/427* (2013.01); *C04B 2235/428* (2013.01); *C04B 2235/5244* (2013.01); *C04B 2235/5248* (2013.01); *C04B 2235/5436* (2013.01); *C04B 2235/5445* (2013.01); *C04B 2235/5472* (2013.01); *C04B 2235/606* (2013.01); *C04B 2235/612* (2013.01); *C04B 2235/616* (2013.01)

(56) References Cited

U.S. PATENT DOCUMENTS

| | | | |
|---|---|---|---|
| 5,840,221 A * | 11/1998 | Lau | B28B 1/265 264/29.7 |
| 5,952,100 A | 9/1999 | Corman et al. | |
| 6,245,424 B1 | 6/2001 | Lau et al. | |
| 6,403,158 B1 | 6/2002 | Corman | |
| 6,609,452 B1 | 8/2003 | McCormick et al. | |
| 6,820,334 B2 | 11/2004 | Kebbede et al. | |
| 6,855,428 B2 | 2/2005 | Lau et al. | |
| 7,378,362 B2 | 5/2008 | Nixon et al. | |
| 7,686,990 B2 | 3/2010 | Gray | |
| 7,842,335 B2 | 11/2010 | Skoog et al. | |
| 7,942,638 B2 | 5/2011 | Eichmann et al. | |
| 8,043,720 B2 | 10/2011 | Corman et al. | |
| 8,474,362 B1 | 7/2013 | Karandikar et al. | |
| 8,846,218 B2 | 9/2014 | Bouillon et al. | |
| 9,238,595 B2 | 1/2016 | Bouillon et al. | |
| 9,713,912 B2 | 7/2017 | Lee | |
| 2005/0158171 A1 | 7/2005 | Carper et al. | |
| 2005/0276931 A1 * | 12/2005 | Che | C23C 14/086 427/569 |
| 2006/0147622 A1 * | 7/2006 | Gray | C04B 35/573 427/180 |
| 2006/0163773 A1 | 7/2006 | Gray | |
| 2007/0075455 A1 | 4/2007 | Marini et al. | |
| 2007/0092762 A1 * | 4/2007 | Corman | C04B 35/573 428/701 |
| 2013/0009348 A1 * | 1/2013 | Murata | B28B 19/00 264/642 |
| 2013/0287941 A1 | 10/2013 | Gray | |
| 2014/0272274 A1 * | 9/2014 | Lazur | F01D 5/147 428/115 |
| 2016/0101561 A1 | 4/2016 | Walston et al. | |
| 2016/0159066 A1 * | 6/2016 | Landwehr | B29C 70/00 428/699 |
| 2016/0214907 A1 | 7/2016 | Shim et al. | |
| 2016/0230570 A1 * | 8/2016 | Harris | C04B 35/62863 |
| 2016/0279744 A1 | 9/2016 | Harris | |
| 2016/0326064 A1 * | 11/2016 | Shim | C04B 35/565 |
| 2016/0356163 A1 | 12/2016 | Freeman et al. | |
| 2017/0247787 A1 | 8/2017 | Saha et al. | |
| 2017/0313627 A1 | 11/2017 | Shim et al. | |
| 2017/0313629 A1 | 11/2017 | Shim et al. | |
| 2019/0256427 A1 * | 8/2019 | Shim | C04B 35/806 |

FOREIGN PATENT DOCUMENTS

| | | |
|---|---|---|
| EP | 1683771 A1 | 7/2006 |
| EP | 3050863 A1 | 8/2016 |
| EP | 3135866 A1 | 3/2017 |
| EP | 3241817 A1 | 11/2017 |
| JP | 2000244582 A | 12/2000 |
| WO | 9824737 A1 | 6/1998 |

OTHER PUBLICATIONS

"Ceramic matrix composite," wikipedia.org, retrieved from https://en.wikipedia.org/wiki/Ceramic_matrix_composite on Oct. 25, 2019, 12 pp.

"Duramax Binders," The Dow Chemical Company, Form No. 233-01075-MM-0513, May 13, 2013, 5 pp.

* cited by examiner

PROTECTIVE LAYER FOR A CERAMIC MATRIX COMPOSITE ARTICLE

TECHNICAL FIELD

The present disclosure generally relates to ceramic matrix composite articles.

BACKGROUND

Ceramic matrix composite (CMC) materials may be useful in a variety of contexts where mechanical and thermal properties are important. For example, components of high temperature mechanical systems, such as gas turbine engines, may be made from CMCs. CMCs may be resistant to high temperatures, but some CMCs may react with some elements and compounds present in the operating environment of high temperature mechanical systems, such as water vapor. These reactions may damage the CMC and reduce mechanical properties of the CMC, which may reduce the useful lifetime of the component.

SUMMARY

In some examples, the disclosure describes a method that includes forming a ceramic matrix composite (CMC) article that includes an integrally formed protective ceramic layer. The protective layer may help seal or otherwise protect the underlying fibers and fiber architecture of the CMC article.

In some examples, the disclosure describes a method including infiltrating a porous fiber preform with a slurry including a carrier fluid and a first plurality of solid particles wherein the first plurality of solid particles includes at least a first ceramic material, drying the slurry to form a greenbody preform, machining the greenbody preform after drying the slurry to a target dimension, depositing a protective layer precursor including a second plurality of solid particles on the machined greenbody preform wherein the second plurality of solid particles includes at least a second ceramic material, and infiltrating the machined greenbody preform with a molten infiltrant to form a composite article including an integral protective layer.

In some examples, the disclosure describes a method including infiltrating a porous fiber preform with a slurry including a carrier fluid and a first plurality of solid particles wherein the first plurality of solid particles includes at least a first ceramic material, drying the slurry to form a greenbody preform, infiltrating the greenbody preform with a molten infiltrant after drying the slurry to form a composite article, depositing a protective layer precursor including a second plurality of solid particles on the composite article wherein the second plurality of solid particles includes at least a second ceramic material and silicon particles, and heating the composite article to reflow the molten infiltrant into the protective layer precursor to form a protective layer.

The details of one or more examples are set forth in the accompanying drawings and the description below. Other features, objects, and advantages will be apparent from the description and drawings, and from the claims.

DETAILED DESCRIPTION

The disclosure describes manufacturing techniques for producing a melt infiltrated ceramic matrix composite (CMC) article, such as a SiC—SiC CMC, that includes an integrally formed protective layer. The techniques described may be used to produce a more robust CMC article that includes a protective ceramic layer integrally formed on the surface of a machined preform either before or after a melt infiltration process. The protective layer may help protect the underlying fiber architecture and reduce the chance of potential degradation to the fiber architecture from environmental attacks such as oxidative degradation. The ceramic particles forming the protective layer may be supplied by either a slurry infiltration cycle or a ceramic tape. After application of the protective layer precursor including the ceramic particles, the article may be further thermally processed via melt infiltration or heating to form a final melt infiltrated CMC article including the integrally formed protective layer. In some examples, the protective layer may behave as a sealing layer to the machined surface to help protect and reduce or substantially prevent exposure of the underlying fiber architecture to external chemical species.

Figure 1:
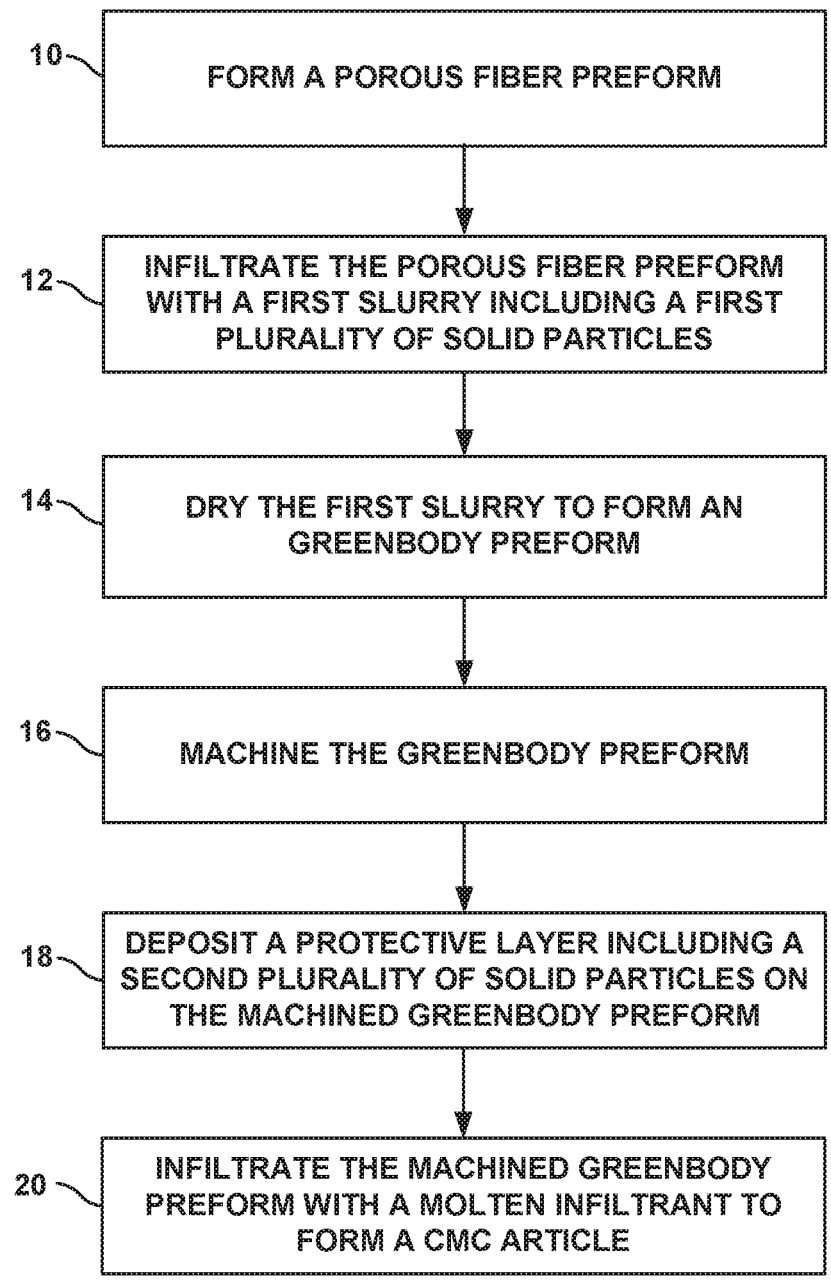
FIG. 1 is a flow diagram illustrating an example technique for forming a CMC article that includes an integrally formed protective layer.

FIG. 1 is a flow diagram illustrating an example technique for forming a CMC article that includes an integrally formed protective layer. The technique of FIG. 1 is described with concurrent reference to FIGS. 2A-2E, which are a series of conceptual diagrams illustrating cross-sectional views of an example fibrous preform 30 as the fibrous preform 30 undergoes the technique of FIG. 1. While the technique of FIG. 1 is described with concurrent reference to the conceptual diagrams of FIGS. 2A-2E, in other examples, the technique of FIG. 1 may be used to form articles other than those described in FIGS. 2A-2E.

The technique of FIG. 1 includes forming a porous fiber preform 30a (10), infiltrating the porous fiber preform 30a with a first slurry (12) that includes a first plurality of solid particles 32; drying the first slurry to form a greenbody preform 30b (14); machining the greenbody preform 30b to near final dimensions (16); depositing a protective layer precursor 34 including a second plurality of solid particles 36 on the machined greenbody preform 30c (18); and infiltrating the machined greenbody preform 30c with a molten infiltrant (20) to form an integral protective layer 49a. The term "greenbody preform" may be used to indicate a fibrous preform that has been infiltrated with an initial slurry mixture of solid particles but has yet not been subjected to a melt infiltration process. In some examples, the greenbody preform may itself be considered a ceramic or CMC component.

Figure 2A:
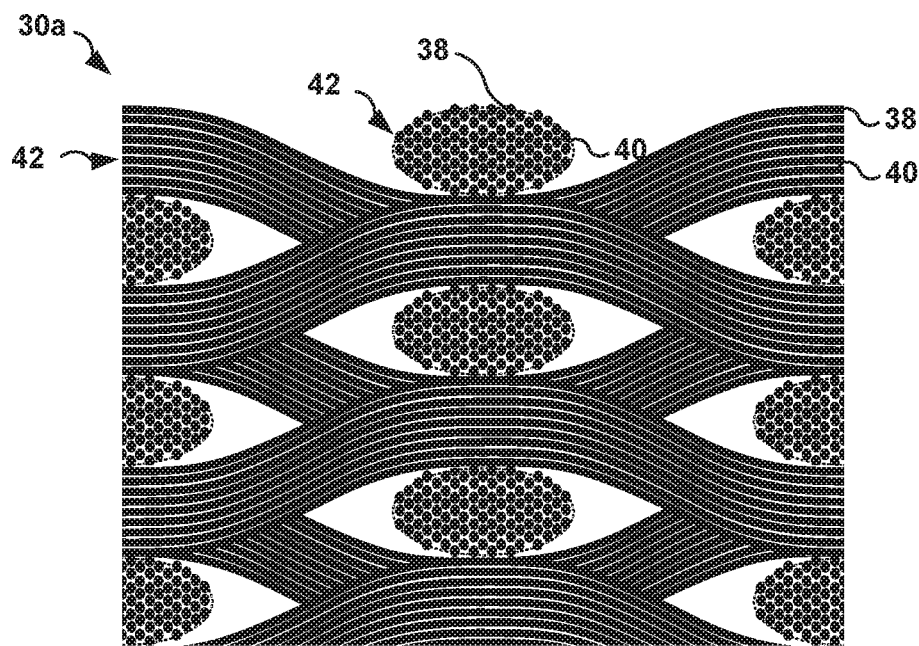
FIGS. 2A-2E are a series of conceptual diagrams illustrating cross-sectional views of an example preform undergoing the manufacturing technique described in FIG. 1.

FIG. 2A is a cross-sectional view of an example porous fiber preform 30a that may be formed (10) as part of the technique of FIG. 1. In some examples, porous fiber preform 30a may be a precursor of a component of a high temperature mechanical system. For example, porous fiber preform 30a may be precursor of a seal segment, a blade track, an airfoil, a blade, a vane, a combustion chamber liner, or the like, of a gas turbine engine. In other examples, porous fiber preform 30a may represent a precursor of a component for a CMC article other than those described above.

Porous fiber preform 30a may include a plurality of fibers 38 and fiber interface material 40, such as a binder material that helps secure fibers 38 together. In some examples, fibers 38 may include continuous or discontinuous fibers. For example, fibers 38 may include woven fibers, non-woven fibers, discontinuous whiskers, tows, platelets, or the like composed of carbon (C), silicon carbide (SiC), or precursor materials (e.g., materials that reduce to C or SiC through subsequent thermal processing). In some examples, fibers 38 may include continuous monofilament or multifilament fibers of one or more of the materials listed above, such as SiC.

As shown in FIG. 2A, fibers 38 may include one or more layers of woven fibers 38 (e.g., woven fabric layers) stacked and secured together. In some such examples, each weave (e.g., waft or weft) of a given layer may include a bundle of fibers 38, or tows 42, woven together. Each tow 42 may represent a plurality of individual fibers 38 bundled together and may include one or more fiber interface materials 36 such as a binder material that helps secure fibers 38 and tows 42 together within a given fabric layer as well as help secure adjacent fabric layers together. In other examples, fibers 38 may be combined using other suitable techniques including, for example, combining fibers 38 as in one or more layers of non-woven fibers, a combination of woven and non-woven fibers, or the like.

Fiber interface material 40 may include any suitable material that may help secure fibers 38 together, help rigidize porous fiber preform 30a, densify porous fiber preform 30a, or combinations thereof. In some such examples, fiber interface material 40 include, for example, a binder material such as polyethylene glycol, acrylate co-polymers, latex co-polymers, polyvinylpyrrolidone co-polymers, polyvinyl butyral, or the like that may be converted into a pyrolytic material such as pyrolytic carbon (PyC) through subsequent thermal processing.

Fiber interface material 40 may be added to fibers 38 using one or more suitable techniques. For example, a binder material may be initially applied to woven fibers 38 as a coating. The woven fabrics may then be stacked together, and the stack may be thermally processed under optional compression to covert fiber interface material 40 to a pyrolytic material.

In some examples, porous fiber preform 30a may be further processed to introduce additional interface or reinforcement material into the preform to help rigidize the structure for subsequent processing. For example, porous fiber preform 30a may be subjected to an initial chemical vapor infiltration (CVI) or chemical vapor depositions (CVD) cycle to deposit one or more reinforcement materials on fibers 38, such as boron nitride (BN), SiC, silicon nitride ($Si_3N_4$), alumina ($Al_2O_3$), aluminosilicate, $SiO_2$, or the like. The additional deposits may help strengthen porous fiber preform 30a to reduce potential damage (e.g., delamination) of the porous fiber preform 30a during the subsequent slurry infiltration. In some examples, porous fiber preform 30a may be acquired in prefabricated form or initially processed independent of the additional deposition techniques described below.

Figure 2B:
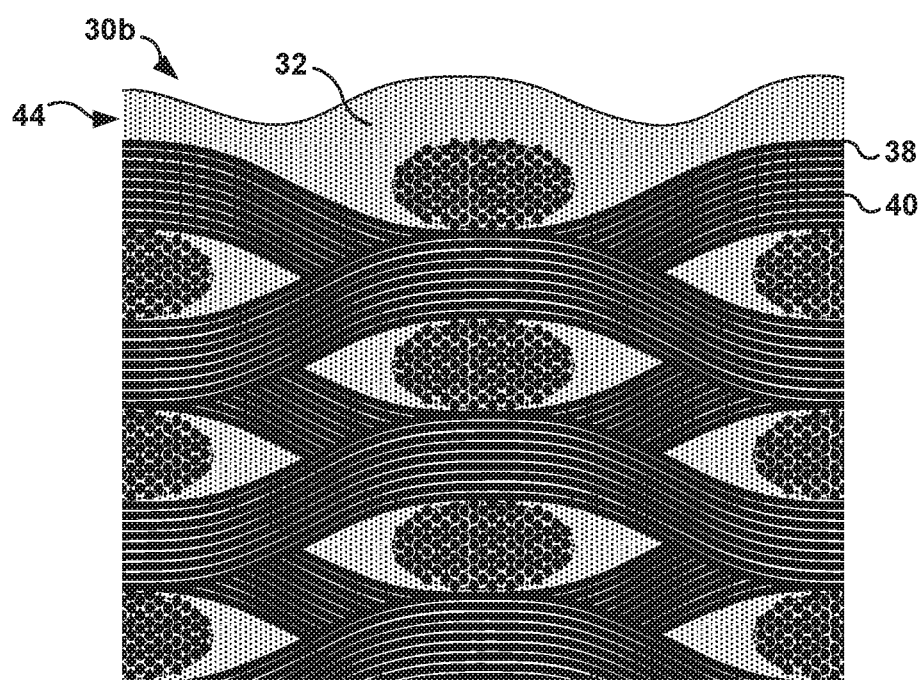

Once porous fiber preform 30a has been formed using either the techniques described above, or any other suitable technique, porous fiber preform 30a may be infiltrated with a first slurry (12) that includes a first plurality of solid particles 32 and dried to form a greenbody preform 30b (14). FIG. 2B shows a cross-sectional view of greenbody preform 30b once the first slurry has been deposited on porous preform 30a and subsequently dried leaving behind first plurality of solid particles 32.

In some examples, first plurality of solid particles 32 may include particles of silicon carbide (SiC), silicon nitride ($Si_3N_4$), alumina ($Al_2O_3$), aluminosilicate (e.g., $Al_2SiO_5$), silica ($SiO_2$), boron carbide ($B_4C$), molybdenum carbide ($Mo_2C$), carbon (e.g., carbon black or diamond particles), or combinations thereof. In some examples, first plurality of solid particles 32 may include at least one type of ceramic particle (e.g., SiC, $Si_3N_4$, $B_4C$, or $Mo_2C$ particles) having a uniformly or non-uniformly distributed particle size. Optionally, the ceramic particles may be mixed with carbon particles (e.g., carbon black or diamond particles) which can serve as precursors that react with the molten infiltrant during the subsequent melt infiltration process (e.g., react with molten silicon to form SiC). In some examples, first plurality of solid particles 32 may be selected to include substantially the same (e.g., the same or nearly the same) components used to form portions (e.g., fibers 38) of porous fiber preform 30a. For example, where fibers 38 include SiC fibers, first plurality of solid particles 32 may likewise include SiC particles or SiC precursor materials (e.g., carbon or silicon) which may react to form SiC during subsequent processing techniques. In this way, first plurality of solid particles 32 may be compatible with fibers 38 and reduce potential stresses exerted within the final melt infiltrated CMC article 48a that may otherwise result due to thermal expansion mismatches affiliated with different materials.

In some examples, first plurality of solid particles 32 of the first slurry may include particles having an average particle diameter sufficiently small to allow the particles to infiltrate into the inner recesses of porous fiber preform 30a. In some examples, first plurality of solid particles 32 may define an average particle diameter less than about 20 micrometers. Additionally, or alternatively, first plurality of solid particles 32 may include a mixture of relatively coarse and relatively fine ceramic particles (e.g., relatively coarse particles that define an average particle size of about 10 micrometers (μm) and about 20 μm and relatively fine particles that define an average particle size of about 0.5 μm to about 5 μm) and optional carbon particles (e.g., carbon black or diamond particles) or other reactive materials. In some such examples, as discussed further below, first plurality of solid particles 32 may be formulated to have the substantially the same (e.g., the same or nearly the same) mixture of solid materials as the second plurality of solid particles 36.

The first slurry may be prepared by dispersing first plurality of solid particles 32 in a carrier fluid (e.g., one or more solvents) along with any other optional additives. The carrier fluid may assist with the deposition of first plurality of solid particles 32 within the inner spaces of porous fiber preform 30a. In some examples, the carrier fluid may include at least one compatible solvent, including, for example, water, ethanol, isopropyl alcohol, methyl ethyl ketone, toluene, or the like. During the deposition and drying of the first slurry (12, 14), the carrier fluid may be substantially removed (e.g., removed or nearly removed) from porous fiber preform 30a, leaving behind the solid contents of the first slurry (e.g. first solid particles 32). In some examples, the carrier fluid may be selected due to its evaporative properties, the preform may be heated to an elevated temperature to promote removal of the carrier fluid, or combinations thereof. In some examples, greenbody preform 30b can be dried at room temperature under vacuum at about 1 Torr, or may be dried at ambient pressure at a temperature of up to about 150° C.

The first slurry may also include one or more optional additives. The additives may be used to tailor or alter the properties of the first slurry. For example, the one or more optional additives may include matrix precursors or other reactive elements that react with elemental silicon or silicon alloy (e.g., carbon) during the melt infiltration process and contribute to the solid materials included in the inner spaces of greenbody preform 30b. In some examples, the one or more optional additives may include a binder (e.g. polyethylene glycol, acrylate co-polymers, latex co-polymers, polyvinyl pyrrolidone co-polymers, polyvinyl butyral, or the like), a dispersant (e.g., ammonium polyacrylate, polyvinyl butyral, a phosphate ester, polyethylene imine, BYK® 110 (available from Byk USA, Inc., Wallingford Conn.), or the like), or the like. Other additives such as a surfactant (e.g., Dynol™ 607 surfactant available from Air Products) or liquefiers may be included in the slurry mixtures to improve wetting of the slurry. The selection and amount of the one or more optional additive components may depend on the intended application for the final melt infiltrated CMC article 48a.

In some examples, the first slurry may be formulated to include about 35% to about 65% by weight carrier fluid, about 35% to 65% by weight of first plurality of solid particles 32 (e.g., more than 50% by weight of the solid materials, e.g., ceramic particles, in the slurry and up to 8% by weight carbon particles), and up to 10% percent by weight optional additives (e.g., up to 2% by weight surfactant, or the like).

During the slurry infiltration process, the first slurry may be applied to porous fiber preform 30a using any suitable technique that allows first plurality of solid particles 32 to at least partially infiltrate the inner spaces (e.g., pores between adjacent fibers 38 or tows 42) of porous fiber preform 30a. For example, the first slurry may be applied by spraying, dip coating, transfer molding, pressure or vacuum infiltration, painting, or the like. In some examples, a vacuum may optionally be drawn prior to slurry introduction to purge gas from the inner spaces of porous fiber preform 30a and further enhance the infiltration process. The slurry infiltration may be conducted at any suitable temperature, including room temperature (e.g., between about 20° C. and about 35° C.). The first slurry infiltration may be enhanced by application of external pressure after slurry introduction, such as a pressure gradient of about one atmosphere.

Additionally, or alternatively, the infiltration of porous fiber preform 30a with the first slurry may be performed using a mold. For example, porous fiber preform 30a may be placed and sealed in the inner cavity of a mold. The first slurry including first plurality of solid particles 32 may be injected into the mold under pressure allowing the first slurry to coat porous fiber preform 30a and infiltrate the inner spaces of the preform. In some examples, the mold may be configured to define an inner cavity sufficiently sized to allow for the formation of a first surface layer 44 during the slurry infiltration process. The mold may be formed of any suitable material including, for example, graphite, silica, alumina, or the like. The material from which the mold is formed may be selected to allow release of greenbody preform 30b after completion of the infiltration step, and to be sufficiently non-reactive with the materials used in forming greenbody preform 30b.

Depending on the amount of first solid particles 32 applied, the infiltration process may form a surface layer 44 (e.g. a first surface layer) on greenbody preform 30a that includes first plurality of solid particles 32. Due to the structure of porous fiber preform 30a, the resultant surface of greenbody preform 30b may define a textured surface. For example, the structure of porous fiber preform 30a may include multiple peaks and valleys due to, for example, the woven pattern formed by fibers 38. The formation of surface layer 44, may reduce the presence of the peaks and valleys, particularly with the number of first slurry infiltration cycles applied, however the surface may still generally follow contours of the underlying fiber architecture. The surface layer 44 formed by the first slurry may be between about 0 micrometers to about 750 micrometers. In some examples, surface layer 44 formed by the first slurry may be less than about 125 micrometers or may be substantially indistinguishable from the major surface of porous fiber preform 30a. In other examples, greenbody preform 30b may not include surface layer 44 formed by the first slurry.

Figure 2C:
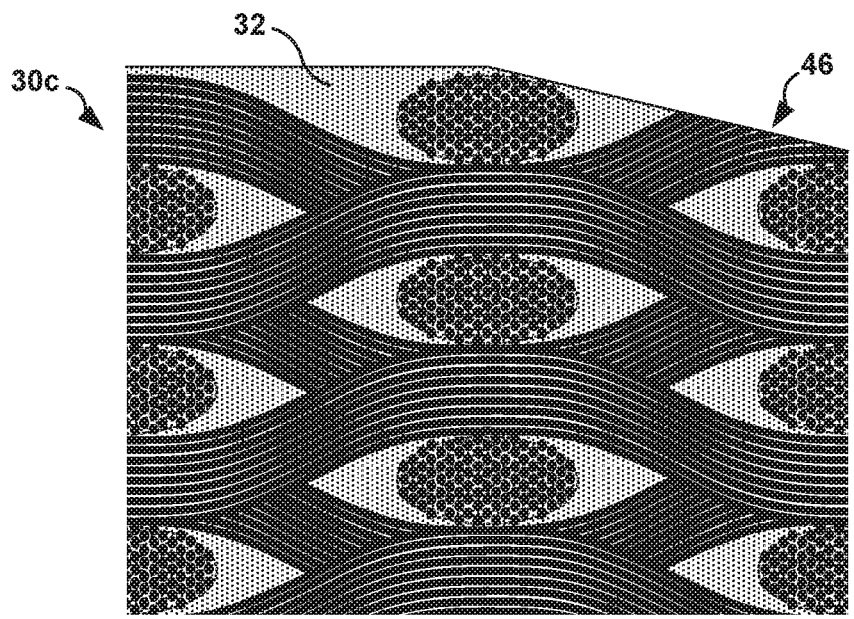

The technique of FIG. 1 also includes machining greenbody preform 30b (16). FIG. 2C illustrates greenbody preform 30b after being machined to near final dimensions (hereinafter "machined greenbody 30c"). In some examples, machining of greenbody preform 30b may include, for example, cutting the preform to size, smoothing or leveling exterior surfaces of the preform, creating surface structures (e.g., recesses or interlocking features) on the surface of the preform, or combinations thereof. The machining may include any type of mechanical machining, including, for example, milling, turning, shaping, planing, grinding, polishing, tumbling, sawing, cutting, trimming, grit blasting, or the like that removes at least a portion of greenbody preform 30b.

Machining greenbody preform 30b, as opposed to a final melt infiltrated CMC article 48a, offers a higher degree of workability because greenbody preform 30b will be less dense and softer than the final melt infiltrated article. Furthermore, because first solid particles 32 will be free or otherwise loosely bound by optional binder materials as opposed to chemically fused or otherwise fixed in place by the melt infiltrant, the processing times to remove portions of greenbody preform 30b will be reduced and take less effort to process the preform into the desired shape and dimensions.

In some examples, machining greenbody preform 30b into near final dimensions, may result in thinning of the surface layer 44 as well as potential exposure of portions underlying fibers 38 (e.g., exposed area 46 shown in FIG. 2C) or fiber architecture, particularly at or near the edges of machined greenbody preform 30c where the deposit of first plurality of solid particles 32 may be relatively thin or where the article has been physically modified (e.g., trimmed or cut) to conform to the final dimensional parameters for the final melt infiltrated CMC article 48a.

Figure 2D:
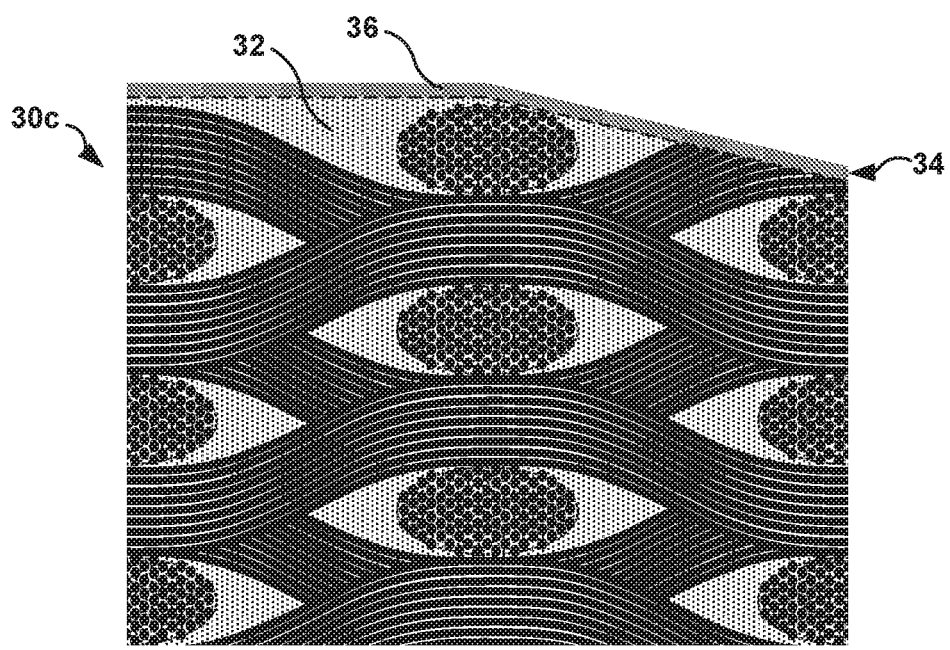
Figure 2E:
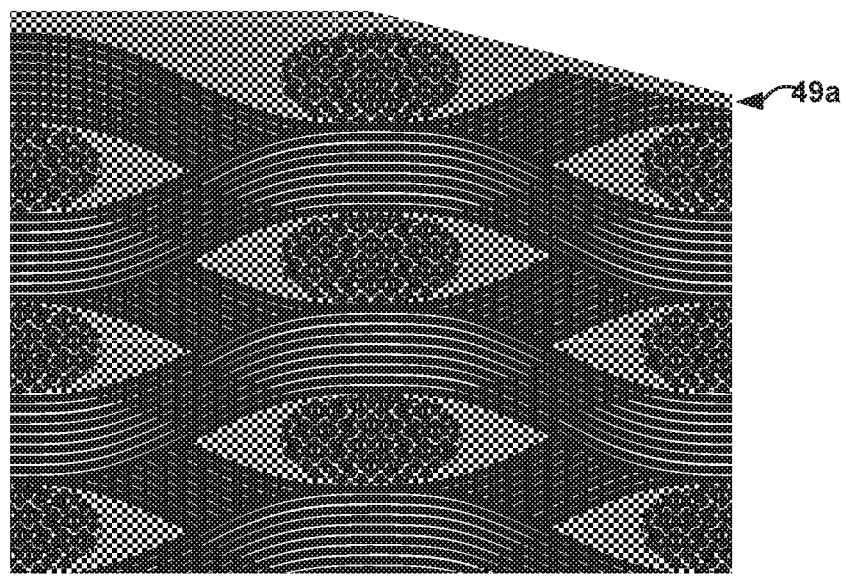

Despite subsequent melt infiltration processing, exposed area 46 of machined greenbody preform 30c may be particularly prone to certain environmental attacks, such as oxidative degradation, during operation of the component. Such degradation may lead to cracking, increased stress, delamination between fibers 38 or fiber layers, or the like. To reduce or substantially prevent such forms or environmental attack, a protective layer precursor 34 including second plurality of solid particles 36 may be deposited on surfaces of machined greenbody preform 30c (18). FIG. 2D illustrates machined greenbody preform 30c with protective layer precursor 34 applied to the machined surfaces.

In some examples, protective layer precursor 34 may be formed using a second slurry infiltration process similar to those discussed above with respect to the deposition of the first slurry. For example, the second slurry may be deposited on a surface of machined greenbody preform 30c by spraying, painting, dip coating, transfer molding, pressure or vacuum infiltration, or the like. The application of the second slurry may be conducted at any suitable temperature, including room temperature (between about 20° C. and about 35° C.). In some examples, the deposition process of the second slurry may include application of external pressure after the slurry application, such as a pressure gradient of about one atmosphere. Once applied, the second slurry may be dried to substantially remove any carrier fluid, thereby depositing the solid materials including second plurality of solid particles 36 on machined greenbody preform 30c to form protective layer precursor 34.

As described above, the carrier fluid for the second slurry may include at least one solvent compatible with second plurality of solid particles 36, including, for example, water, ethanol, isopropyl alcohol, methyl ethyl ketone, toluene, or the like. The relative amount of second plurality of solid particles 36 in the second slurry may be selected to provide a relatively high solid loading content of second solid particles 36 (e.g., up to about 70 vol. %) compared to other materials yet still maintain a workable viscosity (e.g., less than about 1000 centipoise (cP)). In some examples, the second slurry may include about 30 percent by volume (vol. %) to about 90 vol. % of the carrier fluid and about 10 vol. % to about 70 vol. % solid materials (e.g., second plurality of solid particles 36). In some examples, a relatively high solid loading content in the second slurry may also reduce that amount of molten infiltrant used to during subsequent melt infiltration cycle and, ultimately, may reduce an amount of excess molten infiltrant left in final melt infiltrated CMC article 48a. Because unreacted molten infiltrant (e.g., silicon or silicon alloy) may negatively affect properties of final melt infiltrated CMC article 48a, reducing the amount of molten infiltrant that remains in the final article may improve properties of the article.

In some examples, the composition of second plurality of solid particles 36 may be selected to include one or more of the solid particles used in first plurality of solid particles 32 (e.g., SiC, $Si_3N_4$, $Al_2O_3$, $Al_2SiO_5$, $SiO_2$, $B_4C$, $Mo_2C$, carbon particles, or the like) and/or materials that are used in forming any additional outer layers (e.g., bond coats, thermal barrier coatings, environmental coating, or the like) that are subsequently applied to final melt infiltrated CMC article 48a. For example, the second slurry may have a composition that is substantially the same (e.g., the same or nearly the same) as the first slurry plus any additional materials that may improve compatibility with subsequent layers or improve the surface protection of the component such as carbon, molybdenum, hafnium, or tungsten particles. In this way, second plurality of solid particles 36 may reduce the stress exerted on resultant melt infiltrated CMC article 48a and/or additional outer layers as a result of any thermal expansion mismatches between adjacent layers of CMC article 48a.

In some examples, the plurality of second plurality of solid particles 36 may include a plurality of ceramic particles (e.g., SiC, $Si_3N_4$) mixed with reactive particles such as carbon particles (e.g., carbon black, diamond particles, or graphite), molybdenum (Mo), tungsten (W), or combinations thereof. The addition of molybdenum or tungsten to protective layer 34 may inhibit the migration of impurities into or from the resultant melt infiltrated CMC article 48a.

In some examples, second plurality of solid particles 36 may include a mixture of particles that define an average size of less than 20 µm (e.g., about 2.5 µm). In some examples, second plurality of solid particles 36 may include a mixture of coarse and fine particles (e.g., coarse particles that define an average particle size of about 10 micrometers (µm) and about 20 µm and fine particles that define an average particle size of about 0.5 µm to about 5 µm). The mixture of coarse and fine particles may result in protective layer precursor 34 with a lower overall porosity (e.g., lower degree of voided space within the layer) due to the resultant packing arrangement of the particles.

In some examples, including diamond particles in the second plurality of solid particles 36, and optionally the first plurality of solid particles 32, may provide one or more advantages compared to other carbon sources such as carbon black or graphite. For example, diamond particles may contain a lower quantity of impurities compared to other carbon sources, which may correspond to a lower amount of impurities introduced into final melt infiltrated CMC article 48a. Diamond particles also have a higher relative density (e.g., about 3.5 $g/cm^3$) compared to other carbon sources (e.g., density of carbon black is about 1.8-2.1 $g/cm^3$). As a result, the amount of carbon loading in the slurry (e.g., the weight percent (wt. %) of free carbon in the second slurry) may be much higher for diamond particles compared to other carbon sources added to the slurry utilizing the same relative volume percentage. Additionally, diamond particles have been found to have a relatively small impact on the viscosity of a slurry compared to other carbon sources. As a result, the volume percentage of diamond particles added to the slurry (e.g., the second slurry) may be relatively high (e.g., about 10 vol. %) compared to other carbon sources without significantly increasing the viscosity of the slurry. A slurry with viscosity that is too high is no longer viable as a slurry. In some examples, the combination of the higher density of diamond particles and the higher volume percentage of diamond particles added to the second slurry compared to other carbon sources may significantly increase the amount of carbon material deposited in protective layer 34, significantly increase the packing density of the protective layer 34, or a combination of both.

In some examples, as the second slurry dries, the carrier fluid of the second slurry may be wicked into the machined greenbody preform 30c (e.g., into the deposits of first plurality of solid particles 32). The wicking effect may cause the solid materials of the second slurry (e.g., second plurality of solid particles 36) to form protective layer precursor 34 such that the layer defines a higher solid content percentage compared to the solid content percentage created by first plurality of solid particles 32. For example, the deposition and drying of the second slurry may result in a greater density of second plurality of solid particles 36 in the protective layer precursor 34 compared to the density of first plurality of solid particles 32 even though the first and second slurries are formulated to have substantially the same (e.g., the same or nearly the same) composition. In some examples, the wicking effect may help increase the solid content percentage of protective layer precursor 34 compared to the solid content percentage formed by first plurality of solid particles 32 within the inner spaces of machined greenbody preform 30c by as much as 16%. In some examples, the increased solid content percentage of protective layer precursor 34 may help decrease the susceptibility of protective layer precursor 34 to cracking or other defects during subsequent processing and use.

In some examples, the smoothness of protective layer precursor 34 may be improved by formulating the second slurry to have a viscosity less than about 500 cP (e.g., less than 300 cP) to maintain sufficient flowability of the second slurry during application. Additionally, or alternatively, the smoothness of protective layer precursor 34 may be improved by mechanically smoothing the surface of the second slurry (e.g., scraping, rolling, spreading, or the like) once the slurry has been deposited on machined greenbody preform 30*c* prior to drying the second slurry to remove any high spots and assist with leveling of second plurality of solid particles 36. Additionally, or alternatively, the surfaces of protective layer precursor 34 may be lightly polished once the second slurry has been dried on machined greenbody preform 30*c*.

In some examples, protective layer precursor 34 may define an average thickness as measured in a direction normal to the external surface of machined greenbody 30*c* between about 25 μm to about 750 μm (e.g., about 1 mil to about 30 mils). In some examples, the thickness of protective layer precursor 34 may be about 25 μm to about 250 μm.

In other examples, protective layer precursor 34 may be applied to machined greenbody preform 30*c* in the form of a ceramic tape composed of second plurality of solid particles 36. For example, second plurality of solid particles 36 may be prepared as a slurry with an appropriate liquefier and/or binder material and coated onto a foil to a desired thickness and subsequently dried. The ceramic tape may then be press applied (e.g., via a vacuum bag) to exposed surface 46 of machined greenbody preform 30*c* to form protective layer precursor 34. The composition of second plurality of solid particles 36 in the ceramic tape may be substantially the same as described above.

The technique of FIG. 1 also includes infiltrating machined preform 30*c* with a molten infiltrant to form a final melt infiltrated CMC article 48*a* (20). The molten infiltrant may include a molten metal, metalloid, or alloy infiltrant. The molten infiltrant may wick between particles of second plurality of solid particles 36 and between particles of first plurality of solid particles 32 of machined greenbody preform 30*c* to occupy the inner spaces between the respective particles of first and second plurality of solid particles 32 and 36. In some examples, the melt infiltration process (20) may densify the resultant composite article to define an average porosity of less than about 5%, or less than about 3%, or less than about 1%.

In some examples, the molten metal, metalloid, or metal alloy infiltrant may include elemental Si or Si alloy, elemental B or B alloy, Al metal or Al metal alloy, Y metal or Y metal alloy, Ti metal or Ti metal alloy, Zr metal or Zi metal alloy, or the like. In some examples, the molten infiltrant includes elemental Si or Si alloy (e.g., Si and BN powder). In some examples, the temperature for molten infiltration such as molten Si infiltration is between about 1400° C. and about 1500° C. Under these conditions, the duration of the infiltration may be between about 15 minutes and about 4 hours, or between about 20 minutes and about 60 minutes. The melt infiltration process (20) may optionally be carried out under vacuum, but in other examples can be carried out in inert gas under atmospheric pressure to limit evaporation losses. In examples in which the second plurality of solid particles 36 includes mixture of coarse and fine particles (e.g., coarse and fine SiC particles and diamond particles) the particle mixture may inhibit the formation of surface nodules (e.g., silicon nodules) on the exterior surface of the melt infiltrated CMC article 48*a*. After melt infiltration, a protective layer 49*a* is formed from the molten infiltrant and protective layer precursor 34, which is integrally formed with melt-infiltrated CMC 48*a*.

Figure 3:
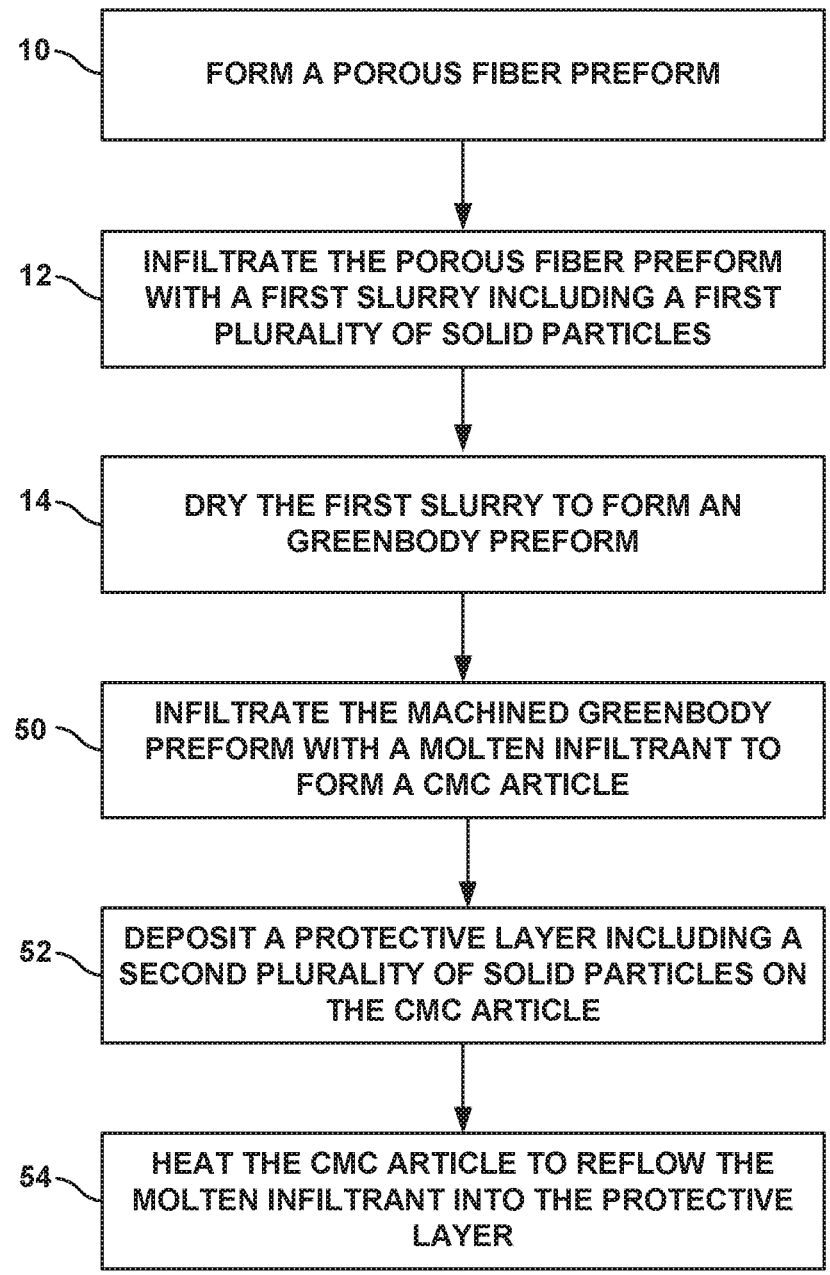
FIG. 3 is a flow diagram illustrating another example technique for forming a CMC article that includes an integrally formed protective layer.

In other examples, the formation of protective layer precursor 34 (18) and the infiltration of machined greenbody preform 30*c* with a molten infiltrant (20) may be performed in a reverse order, followed by an additional heat treatment. FIG. 3 is flow diagram illustrating another example technique for forming a ceramic or CMC article that includes a protective layer. The technique of FIG. 3 includes forming a porous fiber preform 30*a* (10), infiltrating the porous fiber preform 30*a* with a first slurry (12) that includes a first plurality of solid particles 32; drying the first slurry to form a greenbody preform 30*b* (14); infiltrating the greenbody preform (e.g., greenbody preform 30*b* or machined greenbody preform 30*c* if machined prior to infiltration) with a molten infiltrant (50) to form a melt infiltrated CMC article 48*b* ; depositing a protective layer precursor 56 including a second plurality of solid particles 36 on the melt infiltrated CMC article 48*b* (52); and heating melt infiltrated CMC article 48*b* to reflow the molten infiltrant into protective layer precursor 52 (54) to form a final melt infiltrated CMC article 48*c*.

Figure 4A:
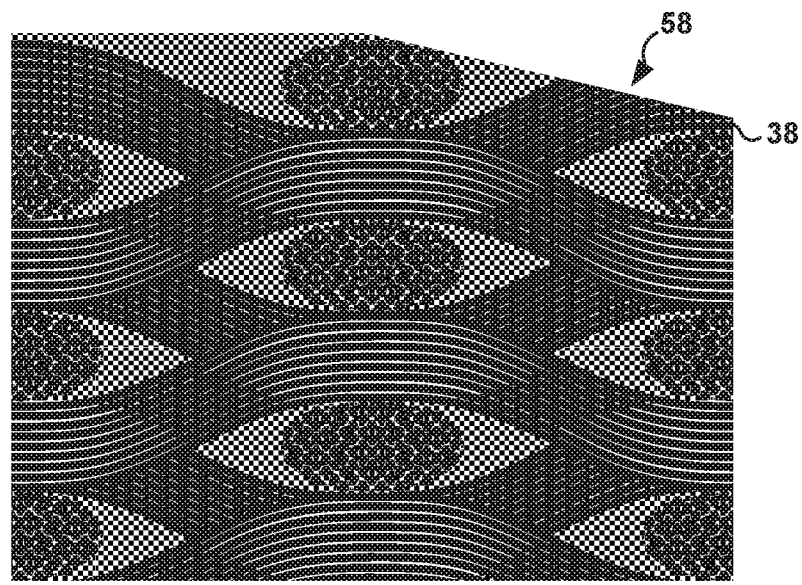
FIGS. 4A-4C are a series of conceptual diagrams illustrating cross-sectional views of an example melt infiltrated CMC article undergoing the manufacturing technique described in FIG. 3.

Steps (10)-(14) of FIG. 3 may be similar to or substantially the same as the steps described in FIG. 1 and will not be discussed again for brevity. Once greenbody preform 30*b* has been formed (FIG. 2B), the greenbody preform may be subjected to a melt infiltration cycle (50) to form a melt infiltrated CMC article 48*b* (FIG. 4A) prior to the deposition of second solid particles 36.

In some examples, after drying the first slurry (14) and prior to the deposition of second solid particles 36 (52), the article can be machined to near final dimensions. The machining may occur when the article is either in a greenbody state (e.g., machined prior to the melt infiltration process such as with machined greenbody preform 30*c* of FIG. 2C) or when the article has already been subjected to the melt infiltration process (e.g., machined as infiltrated CMC article 48*b* to near final dimensions after the infiltration process). While either scenario is applicable, for brevity, the process is generally described below as if the machining occurred on the greenbody preform 30*b* prior to the infiltration process.

In some examples, the melt infiltration process may be substantially the same as described above with respect to the melt infiltration process (20) of FIG. 1 apart from the step of depositing second solid particles 36 to an exterior surface of machined greenbody preform 30*c* before melt infiltration. Like the machined greenbody preform 30*c*, the resultant melt infiltrated CMC article 48*b* may (FIG. 4A), post machining, may still include exposed areas 58 of fibers 38 or portions where the protective ceramic material over fibers 38 remains relatively thin. In some examples, melt infiltrated CMC article 48*b*, if machined as a greenbody, may be further machined to smooth out the exterior surface of the article or remove the presence of any nodules (e.g., silicon nodules), which may increase the chance for exposed areas 58 on melt infiltrated CMC article 48*b*.

Figure 4B:
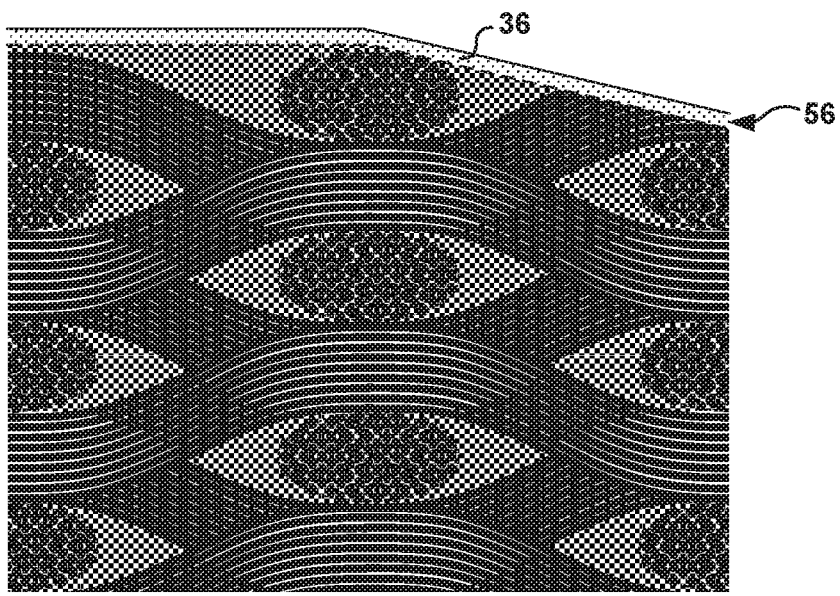

As described above, despite the subsequent melt infiltration processing, exposed areas 58 of melt infiltrated CMC article 48*b* may prone to certain types of environmental attacks, such as oxidative degradation, during operation of the component. Such degradation may lead to cracking, increased stress, delamination between fibers 38 or fiber layers, or the like. To help reduce or prevent such forms or environmental attack, protective layer 56 including second plurality of solid particles 36 may be deposited on surfaces of melt infiltrated CMC article 48*b* (52). FIG. 4B illustrates melt infiltrated CMC article 48*b* with protective layer precursor 56 being applied to the exterior surfaces of the article.

Second plurality of solid particles 36 may be substantially the same the solid particles 36 described above with respect to FIG. 1. Additionally, protective layer 56 including second plurality of solid particles 36 may be deposited on melt infiltrated CMC article 48b using one or more of the deposition techniques described above for forming protective layer 34. For example, protective layer precursor 56 may be formed using a second slurry mixture of ceramic particles and optional carbon or other reactive particles (e.g., tungsten or molybdenum) deposited and dried on melt infiltrated CMC article 48b. In some examples, instead of being applied via a second slurry mixture, the second plurality of solid particles 36 may be processed into a ceramic tape and applied to the exterior surface of melt infiltrated CMC article 48b using, for example, a vacuum application technique. In either of the above example, solid particles 36 may also include the presence of silicon particles, which may help during the subsequent reflow process (54) and formation of the final CMC article 48c.

Figure 4C:
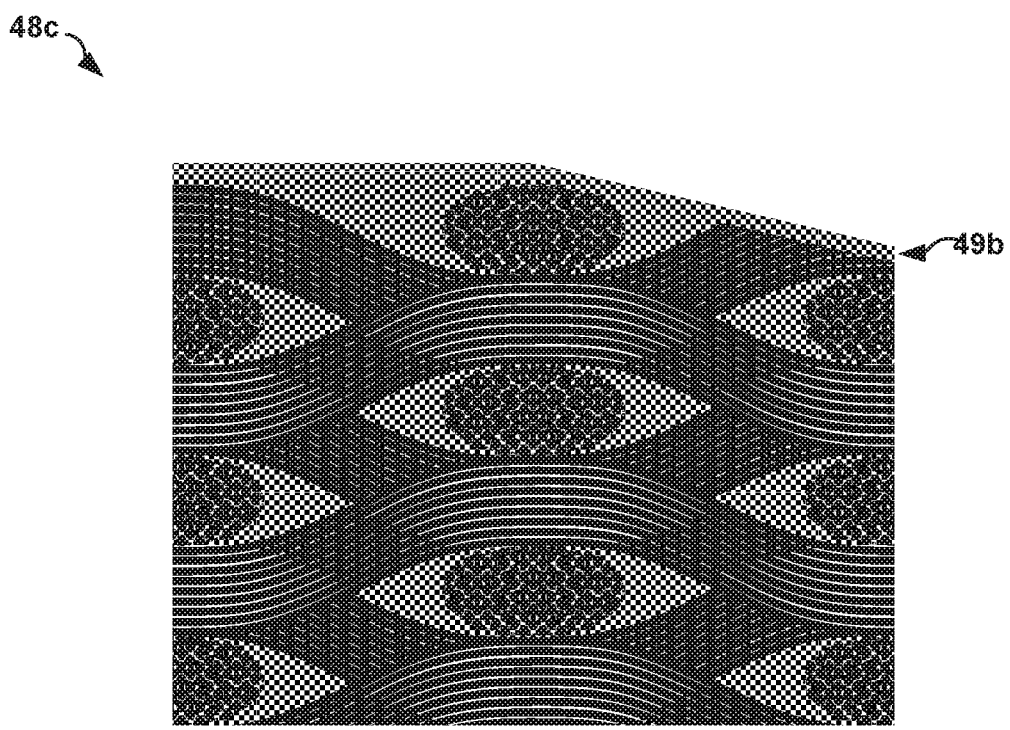

Once protective layer precursor 56 has been formed on melt infiltrated CMC article 48b, article 48b may be heated (54) to allow the molten infiltrant (e.g., silicon or silicon alloy) to reflow into protective layer precursor 56, resulting in a final melt-infiltrated CMC article 48c (FIG. 4C) with integrally formed protective layer 49b. Additionally, or alternatively, heating melt-infiltrated CMC article 48b (54) may include subjecting melt-infiltrated CMC article 48b and protective layer precursor 56 to a subsequent melt infiltration cycle. In some examples, final melt-infiltrated CMC 48c may have similar properties to final melt infiltrated CMC 48a. The infiltrant and second plurality of solid particles 36 form protective layer 49b, which is integrally formed with final melt-infiltrated CMC 48c.

After formation of the final melt-infiltrated CMC article 48a or 48c, one or more optional outer coatings applied to the final melt-infiltrated CMC article 48a or 48c. Such coatings may include, for example, a bond coat, an environmental barrier coating (EBC), an abradable coating layer, a calcia-magnesia-aluminosilicate (CMAS)-resistant layer, or the like. In some examples, a single layer of the one or more optional outer coatings may perform two or more of these functions.

In some examples, a bond coat (not shown) may be deposited on final melt infiltrant CMC article 48a or 48c that includes any useful material to improve adhesion between one or more adjacent layers and the underlying CMC article. In some examples, the bond coat may include silicon, alone, or mixed with at least one other constituent including, for example, at least one of a transition metal carbide, a transition metal boride, or a transition metal nitride; mullite (aluminum silicate, $Al_6Si_2O_{13}$), silica, a silicide, or the like. The bond coat may be formed on protective layer 34 using, for example, plasma spraying, physical vapor deposition (PVD), electron beam physical vapor deposition (EB-PVD), directed vapor deposition (DVD), chemical vapor deposition (CVD), cathodic arc deposition, slurry deposition, sol-gel deposition, electrophoretic deposition, or the like.

Additionally or alternatively, the one or more optional outer coatings on final melt infiltrant CMC article 48a or 48c may include an environmental barrier coatings (EBC) (not shown), which may provide environmental protection, thermal protection, and/or CMAS-resistance the underlying CMC article. An EBC layer may include at least one of a rare earth oxide, a rare earth silicate, an aluminosilicate, or an alkaline earth aluminosilicate. For example, an EBC layer may include mullite, barium strontium aluminosilicate (BSAS), barium aluminosilicate (BAS), strontium aluminosilicate (SAS), at least one rare earth oxide, at least one rare earth monosilicate ($RE_2SiO_5$, where RE is a rare earth element), at least one rare earth disilicate ($RE_2Si_2O_7$, where RE is a rare earth element), or combinations thereof. The rare earth element in the at least one rare earth oxide, the at least one rare earth monosilicate, or the at least one rare earth disilicate may include at least one of Lu (lutetium), Yb (ytterbium), Tm (thulium), Er (erbium), Ho (holmium), Dy (dysprosium), Tb (terbium), Gd (gadolinium), Eu (europium), Sm (samarium), Pm (promethium), Nd (neodymium), Pr (praseodymium), Ce (cerium), La (lanthanum), Y (yttrium), or Sc (scandium). In some examples, the at least one rare earth oxide includes an oxide of at least one of Yb, Y, Gd, or Er.

In some examples, an EBC layer may include at least one rare earth oxide and alumina, at least one rare earth oxide and silica, or at least one rare earth oxide, silica, and alumina. In some examples, an EBC layer may include an additive in addition to the primary constituents of the EBC layer. For example, an EBC layer may include at least one of $TiO_2$, $Ta_2O_5$, $HfSiO_4$, an alkali metal oxide, or an alkali earth metal oxide. The additive may be added to the EBC layer to modify one or more desired properties of the EBC layer. For example, the additive components may increase or decrease the reaction rate of the EBC layer with CMAS, may modify the viscosity of the reaction product from the reaction of CMAS and the EBC layer, may increase adhesion of the EBC layer to the bond coat or final melt infiltrant CMC article 48a or 48c, may increase or decrease the chemical stability of the EBC layer, or the like.

In some examples, the EBC layer may be substantially free (e.g., free or nearly free) of hafnia and/or zirconia. Zirconia and hafnia may be susceptible to chemical attack by CMAS, so an EBC layer substantially free of hafnia and/or zirconia may be more resistant to CMAS attack than an EBC layer that includes zirconia and/or hafnia.

In some examples, the EBC layer may have a dense microstructure, a columnar microstructure, or a combination of dense and columnar microstructures. A dense microstructure may be more effective in preventing the infiltration of CMAS and other environmental contaminants, while a columnar microstructure may be more strain tolerant during thermal cycling. A combination of dense and columnar microstructures may be more effective in preventing the infiltration of CMAS or other environmental contaminants than a fully columnar microstructure while being more strain tolerant during thermal cycling than a fully dense microstructure. In some examples, an EBC layer with a dense microstructure may have a porosity of less than about 20 vol. %, such as less than about 15 vol. %, less than 10 vol. %, or less than about 5 vol. %, where porosity is measured as a percentage of pore volume divided by total volume of the EBC layer.

Additionally, or alternatively, the one or more optional outer coatings on final melt infiltrant CMC article 48a or 48c may include an abradable layer (not shown). The abradable layer may include at least one of a rare earth oxide, a rare earth silicate, an aluminosilicate, or an alkaline earth aluminosilicate. For example, an EBC layer may include mullite, barium strontium aluminosilicate (BSAS), barium aluminosilicate (BAS), strontium aluminosilicate (SAS), at least one rare earth oxide, at least one rare earth monosilicate ($RE_2SiO_5$, where RE is a rare earth element), at least one rare earth disilicate ($RE_2Si_2O_7$, where RE is a rare earth element), or combinations thereof. The rare earth element in the at least one rare earth oxide, the at least one rare earth monosilicate, or the at least one rare earth disilicate may include at least one of Lu (lutetium), Yb (ytterbium), Tm (thulium), Er (erbium), Ho (holmium), Dy (dysprosium), Tb (terbium), Gd (gadolinium), Eu (europium), Sm (samarium), Pm (promethium), Nd (neodymium), Pr (praseodymium), Ce (cerium), La (lanthanum), Y (yttrium), or Sc (scandium). In some examples, the at least one rare earth oxide includes an oxide of at least one of Yb, Y, Gd, or Er.

The abradable layer may be porous. Porosity of the abradable layer may reduce a thermal conductivity of the abradable layer and/or may affect the abradability of the abradable layer. In some examples, the abradable layer includes porosity between about 10 vol. % and about 50 vol. %. In other examples, the abradable layer includes porosity between about 15 vol. % and about 35 vol. %, or about 20 vol. %. Porosity of the abradable layer is defined herein as a volume of pores or cracks in the abradable layer divided by a total volume of the abradable layer (including both the volume of material in the abradable layer and the volume of pores/cracks in the abradable layer).

The abradable layer may be formed using, for example, a thermal spraying technique, such as, for example, plasma spraying. Porosity of the abradable layer may be controlled by the use of coating material additives and/or processing techniques to create the desired porosity. In some examples, substantially closed pores may be desired.

For example, a coating material additive that melts or burns at the use temperatures of the component (e.g., a blade track) may be incorporated into the coating material that forms the abradable layer. The coating material additive may include, for example, graphite, hexagonal boron nitride, or a polymer such as a polyester, and may be incorporated into the coating material prior to deposition of the coating material over protective layer 34 to form the abradable layer. The coating material additive then may be melted or burned off in a subsequent heat treatment, or during operation of the gas turbine engine, to form pores in the abradable layer. The post-deposition heat-treatment may be performed at up to about 1500° C.

The porosity of the abradable layer can also be created and/or controlled by plasma spraying the coating material using a co-spray process technique in which the coating material and coating material additive are fed into the plasma stream with two radial powder feed injection ports. The feed pressures and flow rates of the coating material and coating material additive may be adjusted to inject the material on the outer edge of the plasma plume using direct 90 degree angle injection. This may permit the coating material particles to soften but not completely melt and the coating material additive to not burn off but rather soften sufficiently for adherence in the abradable layer.

Various examples have been described. These and other examples are within the scope of the following claims.

What is claimed is:

1. A method comprising:
  infiltrating a porous fiber preform with a slurry comprising a carrier fluid and a first plurality of solid particles, wherein the first plurality of solid particles comprises at least a first ceramic material;
  drying the slurry to form a greenbody preform;
  after drying the slurry, machining the greenbody preform to a target dimension;
  after machining the greenbody preform, depositing a protective layer precursor comprising a second plurality of solid particles on the machined greenbody preform, wherein the second plurality of solid particles comprises at least a second ceramic material; and
  infiltrating the machined greenbody preform with a molten infiltrant to form a composite article including an integral protective layer.

2. The method of claim 1, wherein the second plurality of solid particles comprises a plurality of fine ceramic particles defining a fine particle average size, a plurality of coarse ceramic particles defining a coarse particle average size, and a plurality of carbon particles, wherein the fine particle average size is less than the coarse particle average size.

3. The method of claim 1, wherein the first plurality of solid particles is different than the second plurality of solid particles.

4. The method of claim 1, wherein the first plurality of solid particles is the same as the second plurality of solid particles.

5. The method of claim 1, wherein depositing the protective layer precursor comprises:
  forming a ceramic tape comprising the second plurality of solid particles; and
  positioning the ceramic tape on an exterior surface of the machined greenbody preform.

6. The method of claim 1, wherein the first plurality of solid particles or the second plurality of solid particles comprise particles of at least one of boron carbide, silicon carbide, silicon nitride, or molybdenum carbide.

7. The method of claim 1, wherein the porous fiber preform comprises a plurality of fibrous layers, each fibrous layer comprising a plurality of silicon carbide fibers.

8. The method of claim 1, wherein machining the greenbody preform to the target dimension comprises exposing at least some fibers of the porous fiber preform.

9. The method of claim 1, wherein the molten infiltrant comprises elemental silicon or a silicon alloy.

10. The method of claim 1, wherein depositing the protective layer precursor comprises:
  depositing a slurry comprising a carrier fluid and the second plurality of solid particles on an exterior surface of the machined greenbody preform; and
  drying the slurry comprising the carrier fluid and the second plurality of solid particles to remove substantially all the carrier fluid and form the protective layer precursor.

11. The method of claim 10, further comprising mechanically smoothing the slurry comprising the carrier fluid and the second plurality of solid particles before the slurry has dried.

12. The method of claim 1, wherein the protective layer defines a thickness between about 25 micrometers ($\mu m$) and about 750 $\mu m$.

13. The method of claim 1, wherein the protective layer defines a thickness between about 25 micrometers ($\mu m$) and about 250 $\mu m$.

14. A method comprising:
  infiltrating a porous fiber preform with a slurry comprising a carrier fluid and a first plurality of solid particles, wherein the first plurality of solid particles comprises at least a first ceramic material;
  drying the slurry to form a greenbody preform;
  after drying the slurry, infiltrating the greenbody preform with a molten infiltrant to form a composite article;
  depositing a protective layer precursor comprising a second plurality of solid particles on the composite article, wherein the second plurality of solid particles comprises at least a second ceramic material and silicon particles; and heating the composite article to reflow the molten infiltrant into the protective layer precursor to form a protective layer.

15. The method of claim 14, wherein the second plurality of solid particles comprises a plurality of fine ceramic particles defining a fine particle average size, a plurality of coarse ceramic particles defining a coarse particle average size, and a plurality of carbon particles, wherein the fine particle average size is less than the coarse particle average size.

16. The method of claim 14, wherein depositing the protective layer precursor comprises:

forming a ceramic tape comprising the second plurality of solid particles; and positioning the ceramic tape on an exterior surface of the composite article.

17. The method of claim 14, wherein depositing the protective layer precursor comprises:

depositing a slurry comprising a carrier fluid and the second plurality of solid particles on an exterior surface of the composite article; and drying the slurry comprising the carrier fluid and the second plurality of solid particles to remove substantially all the carrier fluid and form the protective layer precursor.

18. The method of claim 17, further comprising mechanically smoothing the slurry comprising the carrier fluid and the second plurality of solid particles before the slurry has dried.

19. The method of claim 14, wherein the first plurality of solid particles or the second plurality of solid particle comprise particles of at least one of boron carbide, silicon carbide, silicon nitride, or molybdenum carbide.

20. The method of claim 14, further comprising after drying the slurry and before depositing the protective layer precursor, machining the greenbody preform or the composite article to a target dimension.

* * * * *